(12) United States Patent
Glance

(10) Patent No.: US 6,947,922 B1
(45) Date of Patent: Sep. 20, 2005

(54) RECOMMENDER SYSTEM AND METHOD FOR GENERATING IMPLICIT RATINGS BASED ON USER INTERACTIONS WITH HANDHELD DEVICES

(75) Inventor: Natalie S. Glance, Meylan (FR)

(73) Assignee: Xerox Corporation, Stamford, CT (US)

( * ) Notice: Subject to any disclaimer, the term of this patent is extended or adjusted under 35 U.S.C. 154(b) by 742 days.

(21) Appl. No.: 09/596,070

(22) Filed: Jun. 16, 2000

(51) Int. Cl.$^7$ ............................................. G06F 17/30
(52) U.S. Cl. .............................. 707/3; 707/100; 705/26
(58) Field of Search ................. 705/26; 1/27; 701/201; 707/100, 1, 3, 26

(56) References Cited

U.S. PATENT DOCUMENTS

| | | | |
|---|---|---|---|
| 5,790,426 A | 8/1998 | Robinson ..................... | 364/554 |
| 5,796,952 A * | 8/1998 | Davis et al. ................ | 709/224 |
| 5,842,199 A | 11/1998 | Miller et al. .................. | 707/2 |
| 5,884,282 A | 3/1999 | Robinson ..................... | 705/27 |
| 5,948,040 A * | 9/1999 | DeLorme et al. ........... | 340/990 |
| 6,016,475 A | 1/2000 | Miller et al. .................. | 705/1 |
| 6,041,311 A * | 3/2000 | Chislenko et al. ............ | 705/27 |
| 6,064,980 A * | 5/2000 | Jacobi et al. .................. | 705/1 |
| 6,236,978 B1 * | 5/2001 | Tuzhilin ........................ | 705/1 |
| 6,332,134 B1 * | 12/2001 | Foster ........................... | 705/39 |
| 6,421,717 B1 * | 7/2002 | Kloba et al. ................ | 709/219 |

OTHER PUBLICATIONS

Joseph A. Konstan, Bradley N. Miller, David Maltz, Jonathan L. Herlocker, Lee R. Gordon, and John Riedl, Applying Collaborative Filtering to Usenet News, *Communications of the ACM*, Mar. 1997, p. 77-87.

J. Ben Schafer, Joseph Konstan, and John Riedl, Recommender Systems in E-Commerce, *Proceedings of the 1999 ACM Conference on Electronic Commerce, Denver, CO*, Nov. 1999, p. 158-166.

Upendra Shardanand and Pattie Maes, Social Information Filtering: Algorithms for Automating "Word of Mouth", *Proceedings of the ACM 1995 Conference on Computer Human Interactions, Denver, CO*, 1995, p. 210-217.

Masahiro Morita and Yoichi Shinoda, Information Filtering Based on User Behavior Analysis and Best Match Text Retrieval, *Proceedings of SIGIR '94, Dublin, Ireland*, 1994, p. 272-281.

David M. Nichols, Implicit Rating and Filtering, *Delos Workshop on Filtering And Collaborative Filtering, Budapest, Hungary*, 1997 http://www.ercim.org/publications/ws-proceedings/DELOS5/nichols.ps.gz.

Introducting the Xenote itag, ITAGS, http://www.xenote.com/static.jsp?url=/service/itags/overview.jsp&title=Service.

George Cole, A different tune in every room: MP3 Hardware, FT.com, Financial Times, Jun. 7, 2000.

* cited by examiner

*Primary Examiner*—Alford Kindred
*Assistant Examiner*—CamLihn Nguyen
(74) *Attorney, Agent, or Firm*—Jeannette Walder

(57) ABSTRACT

A recommender system employs implicit ratings generated from monitoring user interaction with an item, such as while listening to a music track on a MP3 player or reading an electronic book. A method for generating item recommendations includes: providing an item to a device having an application for engaging a repetitive activity with the provided item, wherein the repetitive activity occurs primarily during standalone operation of the device; generating a history of user interaction with the provided item, wherein user interaction includes engaging in the repetitive activity with the provided item; transforming the history of user interactions into an implicit rating of the provided item; and using the implicit rating of the provided item to generate recommendations of other items.

3 Claims, 1 Drawing Sheet

RECOMMENDER SYSTEM AND METHOD FOR GENERATING IMPLICIT RATINGS BASED ON USER INTERACTIONS WITH HANDHELD DEVICES

FIELD OF THE INVENTION

This invention relates in general to recommender systems and more particularly to recommender systems associated with handheld devices.

BACKGROUND OF THE INVENTION

Personalization of information delivery is now common on the Internet. In recent years, numerous services involving personalization have become available. Some notable examples include: personalized news services delivered by e-mail (or other push technology); personalized WWW portals centered around Internet directories and Internet search, such as AltaVista, Excite, Lycos; personalized WWW portals around specific domains, such as music (mp3.com), auctions (eBay), finance (eTrade); and personalized e-commerce sites, such as amazon.com.

Personalization of the user's experience is based on user interaction with the site. Explicit user profile data is obtained when the user fills in a registration form, for example. Implicit data on the user is gathered based on user interactions with the site what the user searches for, what the user buys, etc. Many WWW portals now use some form of adaptive recommendation to provide further personalization based on users' profiles. Adaptive recommendation techniques mine the collection of users' profiles to find similarities among users. WWW portal sites can then provide recommendations to users based on what similar users have bought, read, etc. Companies who sell adaptive recommendation services include NetPerceptions, LikeMinds, and DirectHit.

In the near future, much of users' access to information and media will shift from personal computers and the need to be connected to the Internet to handheld devices which are designed primarily for use while not connected to the Internet. Examples of handheld devices include cellular telephones, PDAs (personal digital assistants), MP3 players and portable reading appliances. People already use handheld devices to access financial information, send short messages, perform financial transactions, access weather reports and sports scores, shop on-line, comparison shop, make travel plans (purchase tickets, reserve hotels, maps, etc.), get directions, listen to music, and read books, newspapers and work documents.

Already, some companies are appearing that are trying to position themselves as portal sites for users of handheld devices. These information and media providers will want a way to personalize their offerings to users of handheld devices based on users' interactions with the handheld devices. These information and media providers will want a way to mine the collection of user data and provide personalized recommendations on the basis of user data. A segment of the user population will be willing to trade interaction data in return for improved and personalized information and media delivery.

SUMMARY OF THE INVENTION

A recommender system, according to the invention, for use with handheld devices, employs implicit ratings, i.e., ratings which are based on tracking user interactions with handheld devices, for the purpose of providing personalized services. In contrast with an explicit rating system, where a user must explicitly rate an item, an implicit rating is collected substantially non-intrusively and at very low cost to the user. Typically, the software used for accessing media via the handheld device is modified to allow tracking of user interactions. When the handheld device is connected to a network, such as the Internet, the interaction data is uploaded to an electronic user profile broker. The profile broker generates implicit ratings on items based on user interaction data. The implicit ratings serve as input to an adaptive recommendation service, which uses them to calculate similarities between users and to deliver personalized recommendations.

A method for generating item recommendations, according to the invention includes providing an item to a device having an application for engaging a repetitive activity with the provided item, wherein the repetitive activity occurs primarily during standalone operation of the device; generating a history of user interaction with the provided item, wherein user interaction comprises engaging in the repetitive activity with the provided item; transforming the history into an implicit rating of the provided item; and using the implicit rating of the provided item to generate recommendations of other items.

Gathering of interaction data from user interactions with handheld devices, primarily in disconnected usage, and the transformation of interaction histories into implicit ratings provides a basis for media providers to offer personalized services. Three particular methods for generating implicit ratings of items from the history of user interactions are described: a method based on binary classification; a method based on recency and frequency of interaction with the items; and a method based on normalized time spent interacting with the items. Other methods for transforming histories of user interactions, or combinations of the three described methods, may also be used. Two specific embodiments involving specific handheld devices: an audio or music player (such as an MP3 player); and an electronic document viewer (such as for reading electronic books) are described.

DETAILED DESCRIPTION OF THE PREFERRED EMBODIMENTS

Figure 1:
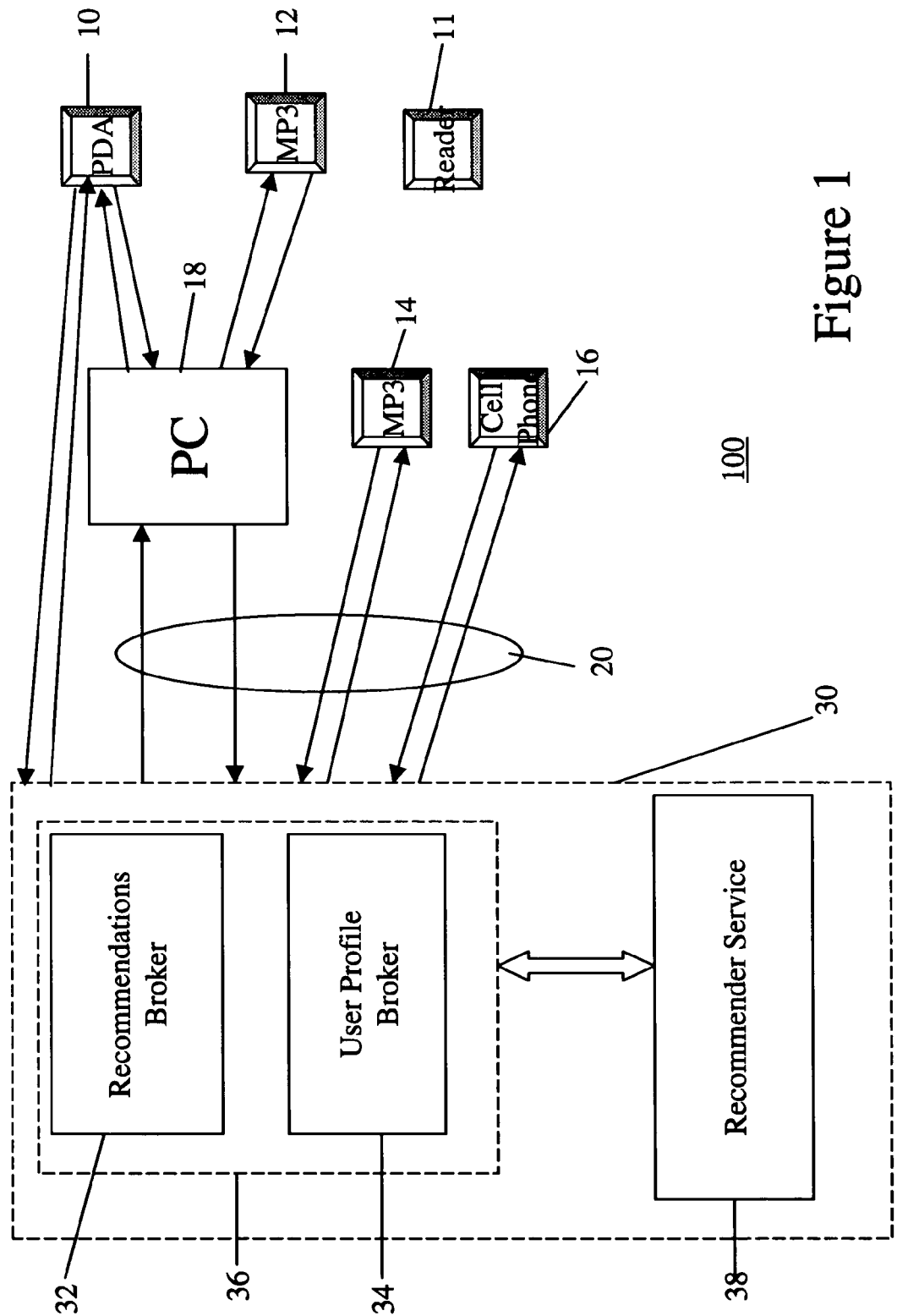
FIG. 1 is a schematic of a system for generating, storing and manipulating implicit ratings based on user interactions with handheld devices according to the invention.

Referring to FIG. 1, a recommender system is generally shown therein and identified by reference numeral 100. The recommender system 100 includes a plurality of handheld devices 10, 11, 12, 14 and 16 and a recommender system 30. Software is included in each handheld device for storing user interactions with the particular device. While some handheld devices (music/MP3 player 14, cell phone 16, PDA 10) can connect directly to the recommender system 30 directly through a network, such as the Internet 20, other devices (personal digital assistant 10, music/MP3 player 12) will typically upload their user interactions to, and download new items to interact with from, a personal computer 18. Reader 11 may connect to the Internet 20 (or other network) either directly or through a personal computer. Personal computer 18 may include media management software for storing and managing the particular items to be downloaded to the handheld devices (10, 12) and may also include software for storing the downloaded user interaction histories.

One embodiment of the invention is a recommender system that provides personalized music recommendations to users having music players, such as a personalized MP3 player (12, 14). The personalized MP3 player tracks which songs the user listens to and how often. While users can listen to songs on a personal computer 18 that is connected to a web site broadcasting songs, most MP3 users download songs for listening while not connected to the Internet. Song titles can be identified by album title/artist or by website and date of release for those artists releasing new music on the Internet before the song is incorporated into an album. Song titles may also be identified by a convenient metadata field contained within the digital music file. User interaction data, i.e., which songs the user listens to, how often and when, is uploaded to a MP3 user profile broker 36, 34 and is transformed into implicit user ratings for each song in the user's collection. While there is a large demand for downloading music tracks for replay on audio players, such as MP3, other audio (or video) tracks, such as weather reports, news reports, sports reports, commentary and other audio material may also be downloaded and rated according to the invention.

The user profile broker 36, 34 may employ an algorithm for transforming the user's listening history into implicit ratings which takes into account both recency and frequency of listening events. This kind of data is a good representation of the user's preferences, apart from errors introduced due to systematic operator error or systematic device error. The profile broker 36, 34 may also merge explicit user preference information provided by the user such as when signing up for a recommender service and listening data for the user obtained in other fashions, e.g., via software connected directly to the network, or via a desktop computer 18 intermittently connected to the network. The profile broker 36, 34 may send the implicit ratings as input to an adaptive recommendation service 38. The recommendation service 38 sends back recommendations of tides and/or artists that it predicts the user will enjoy based on the user's revealed listening history.

The recommender service 38 can thus provide recommendations of the kind: "Since you liked songs X, Y and Z, you will probably also like these new songs by these new artists"; "Don't forget your old favorites X1, Y1, and Z1 . . . "; "Other people who like X, Y, and Z are now listening to X2, Y2 and Z2." The adaptive recommendation service 38 can partition songs by genre (jazz, classical, rock, pop, etc.) and can also partition user profiles by genre. Thus, recommendations can be genre-specific. The relative frequency of recommendations per genre can be made to correspond to the relative frequency with which the user listens to the respective genres.

A second embodiment of the invention is the personalized electronic book viewer, an eBook. eBooks allow users to read items, such as books or articles, on a portable device that mimics a book. As with MP3 players, eBooks are primarily intended for use while not connected to a network. Books can be uniquely identified by ISBN number, but may also be identified by any other convenient method, including a metadata field in the electronic file. Also, clearly the electronic viewer can be used to read other documents, such as magazines, newspapers and the like. The eBook software can be enhanced to track the total time duration for which each item is accessed relative to its length. This normalized time measurement is likely to be a good measure of the time the user actually spent reading the item. eBooks are generally turned off when not in use to save batteries and because start-up time is minimal. In turn, normalized reading times are likely to be a fairly good estimate of the user's interest.

The user data is sent to the electronic profile broker 36, 34, which transforms the data into implicit ratings on the basis of normalized total access times. These implicit ratings are in turn provided to an adaptive recommendation service 38, which uses them to make personalized recommendations to the user. Books and other texts are also generally categorized by genre. The recommender system 30 can then perform recommendation by genre and can partition user profiles by genre.

Other embodiments of the recommender system 100 include a personalized financial assistant and a personalized shopping assistant. For example, user interactions with a stock quote information server can be tracked by software on the device 10. If the user is willing to share this history of stock quote look-ups, in return the user can receive recommendations of stock quotes being accessed by users with similar preferences. The same could be done for financial transactions, although here the issue of privacy is very severe. The electronic profile broker 34 maintaining the user profiles would have to be a highly trusted entity.

Device and PC Software for Tracking User Activities

The handheld device (10, 11, 12, 14, 16) is augmented with software able to track user interactions with information or other media on the handheld device. The device may also contain a clock, accessible by the software, for recording time stamps in those algorithms using a time stamp. In the case of MP3 players 12, 14, the MP3 player has software that records a table of the user's listening events since his/her last connection with a PC 18 or with the network 20. A listening event may include track ID and timestamp (date and time). Upon the next connection to the PC 18 or network 20 (for downloading new tracks to the MP3 player 12, for instance), the listening history is automatically uploaded into the user's music management software (or other music software). When the music management software is next connected to the Internet 20 (e.g., for downloading new music), the listening history is uploaded to the user profile broker 36, 34 and used to update the user's profile. The user profile broker may maintain either a complete or partial history of the user's listening record, such as if older events are deleted from the history.

Alternatively, the user's listening record can be uploaded directly from the MP3 player 14 to the network 20 if the MP3 player can communicate directly with the network 20. In this case, the data is uploaded when the MP3 player 14 connects with the network 20 directly, for example when downloading a song. The music management software implements a user interface for viewing and obtaining recommended tracks. In addition, the device 14 itself may also contain software for displaying recommended tracks on its screen and for permitting the user to download the recommended tracks, in the case where the MP3 player can communicate with the network.

In the case of eBooks, the eBook reader has software that records a table of reading events since the last connection with a PC 18 or the network 20. In the case of the eBook, the table of events may include textID, timestamp_start, timestamp_end. Timestamp_start and timestamp_end consist, respectively, of the date and time when the text was opened and the date and time when the text was closed. The eBook must also have a clock that is accessible by the user.

The case of accessing information remotely via the handheld device, for example, stock quotes, prices, etc. is different. In this case, the device 10, 16 is generally not dedicated to the particular application. Information is accessed in client-server mode, where the device 10, 16 hosts the client application (typically a web clipping) and the server is on the Internet 20. Communication may occur via a wireless network. In this case, the user interactions can be tracked either client-side, or server-side by the host serving the information. Profile data may include, for example, stock symbol and timestamp.

User Profile Broker

The user profile broker 36, 34 maintains a database of user interaction data partitioned by kind and genre. It also generates implicit ratings from the user interaction histories using, for example, one of the algorithms described below. The user profile broker 34 is typically connected to a recommendation service 38, which takes the user profiles of implicit ratings as input. The recommendation service outputs lists of recommended items for the user, organized by kind and genre. This output is processed by the user recommendations broker 32.

One of three algorithms (or a combination of the three or some other algorithm) for transforming user interaction histories into implicit ratings may be used, depending on the particular application of the handheld device. The first algorithm transforms interaction histories into implicit ratings by taking into account recency and frequency of access of the items, and is called an access-based transformation algorithm. This algorithm is generally used for tracking short items, such as music tracks (songs). The second algorithm uses normalized total time spent accessing the items to calculate implicit ratings, and is called a time-based transformation algorithm. This algorithm is generally used for reading electronic books since the length of the work may vary significantly from one book to another. The third algorithm performs a binary classification: accessed items are mapped onto "1"; non-accessed items are by default "0." Music listening records, for example, may be transformed into implicit ratings of music tracks using access-based transformation.

The user profile broker 34 maintains a history of each user's listening record, partitioned by genre. The database tables maintained by the user profile broker are, for example:
  Listening record (userId, songId, datetime(listen))
  Collection(userId, songId, datetime(acquired)
  Genres(genreId, genre name)
  Profile(userId, genreId, songId, rating)
  User (userId, name, . . . )
  Genres (genreId, name)
  Songs (songId, genreId, title, artist, etc.)

A music provider might prefer to use an access-based transformation of the listening history into implicit ratings in order to give higher weight to songs that are accessed more frequently and more recently. One way to do this is as follows:
  rating(songId)=# listens (songId) since datetime(songId, acquired)/# listens (total) since datetime(songId,acquired).

This equation has the advantage of giving high values for both songs that are longstanding favorites and songs that are newly acquired. On the other hand, songs that were listened to often in the past but not more recently are down-weighted. This relationship can be used for obtaining implicit ratings of other items being interacted with by a user.

Reading records, on the other hand, are generally better handled using an algorithm that takes into account total normalized access times to items. One way to do this is as follows:
  rating(bookId)=total reading time for bookId/size of (bookId), where size of (bookId) takes into account only textual content. A time-dependence may also be added to the transformation in order to give more weight to current reading preferences:
  rating(bookId)=[total reading time for bookId/size of (bookId)*exp(-damping coefficient]*date-time acquired).

These relationships can be used for obtaining implicit ratings of other items being interacted with by a user.

Other factors that may be taken into account when transforming reading histories into implicit ratings include: reading fragmentation (Does the user read the item in one sitting or a bit at a time? How does the level of reading fragmentation for an item compare with his/her typical pattern of reading for a genre?) and average total reading time per day for all items (weight transformation by relative fraction of total reading time spent reading an item).

User Recommendations Broker

The user profile broker 36 may also include a user recommendations broker 32. The user recommendations broker 32 saves lists of recommended items (received from the recommender service 38) for users. It serves as a buffer of recommended items, so that recommendations are always available to send to the user when the user connects to the Internet via item/media management or other media software. The recommendations broker 32 will send a subset of recommended items to the user, ascertaining first that the user has not acquired the item(s) in the time since the recommendations were determined (by querying the user profile broker 34). The recommendations broker 32 can use one or more of different techniques for selecting among the recommended items: for example, (1) top N; or (2) N chosen randomly from top M.

Recommender Service

The recommender service 38 takes as input implicit ratings from a set of users on a set of objects via a user profile broker. It outputs one or more of the following: predicted ratings for users for items not rated by the users, preferably with a measure of the confidence in the prediction and preferably including a rationale for the prediction, all three to be used in the filtering and presentation of recommended items and a set of recommended items not rated by the user for each user, preferably ranked in order of most recommended to least recommended.

One form of adaptive recommendation performs matrix filling on the sparse matrix of user-object ratings. One way to do matrix filling is to use the constrained Pearson r Algorithm. This algorithm calculates user-user correlations for each pair of users on the basis of user ratings. The user-user correlations are then used to calculate a correlation-weighted average prediction for each unrated object.

The invention has been described with reference to particular embodiments for convenience. Modifications and alterations will occur to others upon reading and understanding this specification taken together with the drawings. The embodiments are but examples, and various alternatives, modifications, variations or improvements may be made by those skilled in the art from this teaching which are intended to be encompassed by the following claims.

What is claimed is:

1. A method for generating recommendations, comprising:
  providing an item of a particular type to a handheld de having an application for engaging in a repetitive activity with items of the particular type, wherein the repetitive activity comprises displaying or playing items of the particular type to a user;
  generating a history of user interaction with the provided item, wherein a user interaction comprises an instance of a user causing the application to display or play the provided item to the user and duration of the display or play, wherein each user interaction occurs during standalone operation of the handheld device disconnected from a network;
  wherein the history of user interactions is transformed into recency and frequency of interaction data pertaining to the provided item;
  uploading the history of user interactions to a network recommender;
  transforming the history into an implicit rating of the provided item, wherein the history of user interactions with the provided item may be used to create more accurate statistical profiles the rating comprising predicted ratings for a user for a plurality of items not rated by the user, having measure of confidence in the prediction and a rationale for the prediction;
  using the implicit rating of the provided item to generate recommendations of other items of the particular type; and
  wherein an implicit rating is generated in accordance with the relationship: rating(item)=number of interactions (item) since datetime(item acquired)/number of total interactions (item) since datetime(item acquired).

2. A method for generating recommendations, comprising
  providing an item of a particular type to a handheld device having an application for engaging in a repetitive activity with items of the particular type, wherein the repetitive activity comprises displaying or playing items of the particular type to a user;
  generating a history of user interaction with the provided item, wherein a user interaction comprises an instance of a user causing the application to display or play the provided item to the user and duration of the display or play, wherein each user interaction occurs during standalone operation of the handheld device disconnected from a network;
  wherein the history of user interactions is transformed into data pertaining to normalized time spent interacting with the provided item;
  uploading the history of user interactions to a network recommender;
  transforming the history into an implicit rating of the provided item, wherein the history of user interactions with the provided item may be used to create more accurate statistical profiles the rating comprising predicted ratings for a user for a plurality of items not rated by the user, having a measure of confidence in the prediction and a rationale for the prediction;
  using the implicit rating of the provided item to generate recommendations of other items of the particular type; and
  wherein an implicit rating is generated in accordance with the relationship: rating(item)=total interaction time (item)/size(item).

3. A method for generating recommendations, comprising:
  providing an item of a particular type to a handheld device having an application for engaging in a repetitive activity with items of the particular type, wherein the repetitive activity comprises displaying or playing items of the particular type to a user;
  generating a history of user interaction with the provided item, wherein a user interaction comprises an instance of a user causing the application to display or play the provided item to the user and duration of the display or play, wherein each user interaction occurs during standalone operation of the handheld device disconnected from a network;
  wherein the history of user interactions is transformed into data pertaining to normalized time spent interacting with the provided item;
  uploading the history of user interactions to a network recommender;
  transforming the history into an implicit rating of the provided item, wherein the history of user interactions with the provided item may be used to create more accurate statistical profiles the rating comprising predicted ratings for a user for a plurality of items not rated by the user, having a measure of confidence in the prediction and a rationale for the prediction;
  using the implicit rating of the provided item to generate recommendations of other items of the particular type; and
  wherein an implicit rating is generated in accordance with the relationship: rating(item)=[total interaction time (item)/size(item)*exp(−damping coefficient] *(date−time acquired).

* * * * *